US012679396B2

(12) United States Patent (10) Patent No.: US 12,679,396 B2

Münning et al. (45) Date of Patent: Jul. 14, 2026

(54) METHOD FOR CHECKING THE PLAUSIBILITY OF A TRAJECTORY GENERATED ON THE BASIS OF SWARM DATA FOR A MOTOR VEHICLE WHICH IS OPERATED IN AN AT LEAST PARTIALLY ASSISTED MANNER, COMPUTER-READABLE MEDIUM, AND ASSISTANCE SYSTEM

(71) Applicants: Volkswagen Aktiengesellschaft, Wolfsburg (DE); Cariad SE, Wolfsburg (DE)

(72) Inventors: Daniel Münning, Braunschweig (DE); Ferdinand Farenholtz, Berlin (DE); Michael Stark, Berlin (DE); Thomas Strehlow, Braunschweig (DE)

(73) Assignees: Volkswagen Aktiengesellschaft, Wolfsburg (DE); Cariad SE, Wolfsburg (DE)

( * ) Notice: Subject to any disclaimer, the term of this patent is extended or adjusted under 35 U.S.C. 154(b) by 69 days.

(21) Appl. No.: 18/702,765

(22) PCT Filed: Oct. 17, 2022

(86) PCT No.: PCT/EP2022/078833
§ 371 (c)(1),
(2) Date: Apr. 18, 2024

(87) PCT Pub. No.: WO2023/066864
PCT Pub. Date: Apr. 27, 2023

(65) Prior Publication Data
US 2024/0409107 A1 Dec. 12, 2024

(30) Foreign Application Priority Data
Oct. 19, 2021 (DE) ..................... 10 2021 127 078.2

(51) Int. Cl.
*B60W 50/04* (2006.01)

(52) U.S. Cl.
CPC ..... *B60W 50/045* (2013.01); *B60W 2050/046* (2013.01); *B60W 2554/408* (2020.02)

(58) Field of Classification Search
CPC ......... B60W 50/045; B60W 2050/046; B60W 2554/408; G01C 21/3602; G01C 21/3804
See application file for complete search history.

(56) References Cited

U.S. PATENT DOCUMENTS

| | | | | |
|---|---|---|---|---|
| 4,879,658 A | * | 11/1989 | Takashima | G01C 21/30 340/995.25 |
| 6,575,902 B1 | * | 6/2003 | Burton | A61B 5/398 600/595 |

(Continued)

FOREIGN PATENT DOCUMENTS

| | | |
|---|---|---|
| DE | 102015013085 A1 | 3/2016 |
| DE | 102018202712 A1 | 8/2019 |

(Continued)

OTHER PUBLICATIONS

"DCP-SLAM: Distributed Collaborative Partial Swarm SLAM for Efficient Navigation of Autonomous Robots," Mahboob et al., Sensors (Basel, Switzerland), 23(2), 1025; Jan. 16, 2023. (Year: 2023).*

(Continued)

*Primary Examiner* — Khoi H Tran
*Assistant Examiner* — Jorge O Peche
(74) *Attorney, Agent, or Firm* — Seed Intellectual Property Law Group LLP

(57) ABSTRACT

The disclosure relates to a method for checking plausibility of a trajectory generated based on swarm data for a first motor vehicle, which is operated in an at least partially assisted manner. The method includes: receiving the swarm (Continued)

data, detecting a second motor vehicle in a surrounding area of the first motor vehicle by a detection device, determining a driving trajectory of the second motor vehicle, comparing the trajectory generated based on the swarm data with the driving trajectory of the second motor vehicle, and checking the plausibility of the swarm data based on the comparing. The disclosure further relates to a computer-readable medium and to an assistance system.

8 Claims, 4 Drawing Sheets

(56) References Cited

U.S. PATENT DOCUMENTS

| | | | | |
|---|---|---|---|---|
| 6,842,674 | B2 * | 1/2005 | Solomon | G05D 1/0088 |
| | | | | 73/178 R |
| 9,091,558 | B2 * | 7/2015 | Su | B60W 30/12 |
| 9,222,789 | B2 | 12/2015 | Schmidt et al. | |
| 9,947,145 | B2 * | 4/2018 | Wang | G08G 1/164 |
| 10,760,926 | B2 * | 9/2020 | Engel | H04W 4/70 |
| 10,814,872 | B2 * | 10/2020 | Sofra | B60W 30/10 |
| 10,825,344 | B2 * | 11/2020 | Belapurkar | G06Q 20/0855 |
| 11,403,941 | B2 * | 8/2022 | Lange | G08G 1/08 |
| 11,460,860 | B2 | 10/2022 | Max et al. | |
| 11,493,597 | B2 * | 11/2022 | Bruns | G01S 17/931 |
| 12,358,501 | B2 * | 7/2025 | Münning | B60W 60/001 |
| 2004/0030451 | A1 * | 2/2004 | Solomon | H04B 7/18517 |
| | | | | 73/178 R |
| 2006/0161341 | A1 * | 7/2006 | Haegebarth | G08G 1/22 |
| | | | | 701/117 |
| 2006/0213728 | A1 * | 9/2006 | Yoshikawa | B66B 1/2458 |
| | | | | 187/382 |
| 2010/0061591 | A1 * | 3/2010 | Okada | G08G 1/167 |
| | | | | 382/103 |
| 2012/0203409 | A1 * | 8/2012 | Sekijima | B60L 53/66 |
| | | | | 713/320 |
| 2014/0129073 | A1 * | 5/2014 | Ferguson | B62D 15/025 |
| | | | | 701/23 |
| 2014/0302774 | A1 * | 10/2014 | Burke | G07C 5/08 |
| | | | | 455/3.05 |
| 2015/0073705 | A1 * | 3/2015 | Hiwatashi | G01S 19/13 |
| | | | | 701/468 |
| 2015/0154871 | A1 * | 6/2015 | Rothoff | G05D 1/0295 |
| | | | | 701/2 |
| 2015/0177007 | A1 * | 6/2015 | Su | G05D 1/0246 |
| | | | | 701/25 |
| 2015/0228195 | A1 * | 8/2015 | Beaurepaire | B60Q 1/547 |
| | | | | 340/907 |
| 2017/0010618 | A1 * | 1/2017 | Shashua | G01C 21/30 |

| | | | | |
|---|---|---|---|---|
| 2017/0124476 | A1 * | 5/2017 | Levinson | B60L 3/0007 |
| 2017/0225682 | A1 * | 8/2017 | Schunk | B60L 15/38 |
| 2018/0196442 | A1 * | 7/2018 | Wang | G05D 1/0274 |
| 2018/0203455 | A1 * | 7/2018 | Cronin | G05D 1/0217 |
| 2018/0231387 | A1 * | 8/2018 | Thiel | G01C 21/3811 |
| 2019/0129435 | A1 * | 5/2019 | Madsen | A01B 69/001 |
| 2019/0179337 | A1 * | 6/2019 | Ji | G06N 20/00 |
| 2019/0236959 | A1 * | 8/2019 | Belapurkar | G08G 1/22 |
| 2019/0346845 | A1 * | 11/2019 | Rottkamp | B60W 30/0956 |
| 2019/0389459 | A1 * | 12/2019 | Berntorp | B60W 30/0956 |
| 2020/0003564 | A1 * | 1/2020 | Zhang | B60W 60/0013 |
| 2020/0070834 | A1 * | 3/2020 | Mizoguchi | G08G 1/0125 |
| 2020/0133307 | A1 * | 4/2020 | Kelkar | G08G 1/22 |
| 2020/0189598 | A1 * | 6/2020 | Eigel | B60W 10/20 |
| 2020/0242922 | A1 * | 7/2020 | Dulberg | G08G 1/166 |
| 2020/0284594 | A1 * | 9/2020 | Wang | G08G 1/0112 |
| 2020/0312155 | A1 * | 10/2020 | Kelkar | B60W 60/005 |
| 2021/0065545 | A1 * | 3/2021 | Lange | G08G 1/091 |
| 2021/0129844 | A1 * | 5/2021 | George | B60W 30/12 |
| 2022/0082403 | A1 * | 3/2022 | Shapira | G01C 21/3602 |
| 2022/0111865 | A1 * | 4/2022 | Lawrence | G01C 21/3602 |
| 2022/0204048 | A1 * | 6/2022 | Klomp | G08G 1/0129 |
| 2022/0212663 | A1 * | 7/2022 | Münning | B60W 50/16 |
| 2022/0332316 | A1 | 10/2022 | Münning et al. | |
| 2024/0174239 | A1 * | 5/2024 | Narayanan | B60W 60/001 |
| 2024/0182027 | A1 * | 6/2024 | Münning | B60W 30/12 |
| 2024/0253648 | A1 * | 8/2024 | El Amouri | B60W 50/16 |
| 2024/0383482 | A1 * | 11/2024 | Boydston | G01S 17/931 |
| 2024/0409107 | A1 * | 12/2024 | Münning | B60W 50/045 |
| 2025/0018954 | A1 * | 1/2025 | Boydston | G01S 17/931 |
| 2025/0091573 | A1 * | 3/2025 | Stark | B60W 30/12 |
| 2025/0178595 | A1 * | 6/2025 | Nister | B60W 60/0027 |
| 2025/0368227 | A1 * | 12/2025 | Hendler | B60W 60/0015 |

FOREIGN PATENT DOCUMENTS

| | | | | | |
|---|---|---|---|---|---|
| DE | 102018221054 | B4 * | 12/2020 | | G01C 21/3889 |
| DE | 102019213185 | A1 | 3/2021 | | |
| DE | 102019217429 | A1 | 5/2021 | | |
| DE | 102020202163 | A1 | 8/2021 | | |
| DE | 112020006427 | T5 * | 12/2022 | | G08G 1/09623 |
| WO | 2016/177481 | A1 | 11/2016 | | |
| WO | 2019/214828 | A1 | 11/2019 | | |
| WO | WO-2025190562 | A1 * | 9/2025 | | B60W 50/14 |

OTHER PUBLICATIONS

"MiTra: A Drone-Based Trajectory Data for an All-Traffic-State Inclusive Freeway with Ramps;" Chaudhari et al., Scientific Data, 12, 1174; Jul. 9, 2025 (Year: 2025).*
"An Approach to Vehicle Trajectory Prediction Using Automatically Generated Traffic Maps;" Quehl et al., ARXIV ID: 1802.08632; Feb. 23, 2018. (Year: 2018).*

* cited by examiner

METHOD FOR CHECKING THE PLAUSIBILITY OF A TRAJECTORY GENERATED ON THE BASIS OF SWARM DATA FOR A MOTOR VEHICLE WHICH IS OPERATED IN AN AT LEAST PARTIALLY ASSISTED MANNER, COMPUTER-READABLE MEDIUM, AND ASSISTANCE SYSTEM

BACKGROUND

Technical Field

Method for checking the plausibility of a trajectory generated on the basis of swarm data for a motor vehicle which is operated in an at least partially assisted manner, computer-readable medium and assistance system

Description of the Related Art

The disclosure relates to a method for checking the plausibility of a trajectory generated based on swarm data for a motor vehicle operated in at least partially assisted manner by way of an assistance system. Further, the disclosure relates to a computer-readable medium as well as to a corresponding assistance system.

From the prior art, transversely guiding and longitudinally guiding driver assistance systems are already known, which can also be referred to as travel assist systems, which can correspondingly capture the surrounding area based on camera live lanes of the surrounding area and can thereupon in turn intervene in the transverse guidance and longitudinal guidance, respectively, of the motor vehicle in controlling manner. In particular in situations, where a live lane is for example not recognized, thus, a transverse guidance either cannot be offered. Further, so-called swarm data is already known from the prior art, which is generated based on historic data and for example describes motor vehicles in the past in the same position and corresponding trajectories are also traveled. These trajectories can then be used to allow an at least partially automated operation of the motor vehicle. In particular if the control is now realized based on the swarm data, it has to be ensured that the swarm data is also plausible.

U.S. Pat. No. 10,760,926 B2 describes a method for plausibility check of measurement values of a mobile device, wherein a sensor device of the mobile device generates at least one measurement value, at least two pieces of information with respect to the at least one measurement value are received from the mobile device via a communication service and the at least one measurement value is checked for plausibility based on the at least two pieces of information.

WO 2019/214828 A1 relates to a method for a following vehicle, which follows a preceding vehicle, wherein a position and a heading of the preceding vehicle are determined, a position and a heading of the following vehicle are determined, a path for the following vehicle is subsequently set by adapting a curve to the positions and the heading and the following vehicle is controlled such that it moves along the set path.

U.S. Pat. No. 9,222,789 B2 describes an automatic path finding method for an ego or a first vehicle. The method includes receiving position information, which is transferred from at least one leading vehicle, and creating a route based on the received position information.

BRIEF SUMMARY

It is the object of the present disclosure to provide a method, a computer-readable medium as well as an assistance system, by way of which received swarm data can be checked for plausibility in simple manner.

An aspect of the disclosure relates to a method for computer-readable medium checking a trajectory generated based on swarm data for plausibility for a motor vehicle operated in at least partially assisted manner by way of an assistance system. Receiving the swarm data by way of a swarm data receiving device of the assistance system is effected. At least one further motor vehicle in an immediate surrounding area of the motor vehicle is detected by way of a detection device of the assistance system. Determining a driving trajectory of the further motor vehicle, in particular based on the detection with the detection device, is effected by way of an electronic computing device of the assistance system. The trajectory generated based on the swarm data is compared to the driving trajectory of the further motor vehicle by way of the electronic computing device. Depending on the comparison, checking the swarm data for plausibility by way of the electronic computing device is effected.

Thereby, it is in particular allowed that the received swarm data is simply and yet reliably checked for plausibility based on the detection by way of the detection device.

The swarm data is in particular information of further motor vehicles, which already have traveled the surrounding area, in particular the roadway, on which the motor vehicle is located, in the past. This swarm data is then historically stored, for example in an electronic computing device external to motor vehicle, and can then be transferred from it to the swarm data receiving device of the motor vehicle. The swarm data can for example be position data as well as speed data of the historic motor vehicles.

Thus, surrounding areas can in particular be traveled operated in at least partially assisted manner, in which roadway markers are not detected by way of the detection device, but at least one front object has recognized them in the direction of travel. This front object is then compared to the swarm data to check the swarm data for plausibility. Thus, a comparison of the swarm data is not effected to correspondingly recognized lanes, but based on the further motor vehicle.

Presently, in particular a motion vector of the at least one further motor vehicle is to be understood by the driving trajectory, which can in particular be defined by at least two points. The two points are in particular the old state of the at least one further motor vehicle as well as the new state of the at least one further motor vehicle. After generating the motion vector, the two points can again be discarded.

According to an advantageous form of configuration, the further motor vehicle is detected by way of a detection device formed as a camera and/or as a radar sensor and/or as a lidar sensor and/or as an ultrasonic sensor. Preferably, a camera can in particular be used. Thus, the camera for example in particular detects a rear of the further motor vehicle and can ascertain the driving trajectory of the further motor vehicle. In particular, the camera and/or the radar sensor and/or the lidar sensor and/or the ultrasonic sensor are already present in series in motor vehicles operated in at least partially assisted manner such that it can be resorted to already installed technology.

It is further advantageous if the swarm data is checked for plausibility in case of a deviation of the trajectory generated based on the swarm data from the driving trajectory below a preset threshold value. Thus, the further motor vehicle in particular does not have to exactly follow the swarm trajectory, but deviations are allowed, which are below a preset threshold value. Thus, the check for plausibility can be very reliably and robustly performed.

In a further advantageous form of configuration, a distance threshold value of the trajectory and the driving trajectory and/or an angle threshold value between the trajectory and the driving trajectory are preset as the threshold value. For example, a lateral distance between the trajectory and the driving trajectory can be ascertained and a threshold value can in particular be provided thereto. If the deviation should then be correspondingly low, thus, the swarm trajectory can be correspondingly made plausible. Further, a relative angle between the trajectory and the driving trajectory can also be ascertained, wherein it can then also be used below an angle threshold value to make the swarm data plausible. Alternatively, if the threshold values should for example be exceeded, thus, the swarm data cannot be made plausible.

It is also advantageous if the further motor vehicle is detected as a motor vehicle driving in front of the motor vehicle. In particular, a rear of the further motor vehicle can for example be detected. The further motor vehicle is in particular on the same lane or on an adjacent lane to the motor vehicle and moves in particular substantially in the same direction as the motor vehicle. Thus, it is allowed that the driving trajectory of the further motor vehicle can be ascertained and compared to the swarm trajectory.

According to a further advantageous form of configuration, a drivable trajectory for the motor vehicle is determined depending on the trajectory generated based on the swarm data and the driving trajectory and the comparison. Thus, a drivable trajectory can in particular be determined for the motor vehicle. It can be substantially identical to the trajectory generated based on the swarm data and/or the driving trajectory. However, updates can further also occur, for example based on the comparison, such that the drivable trajectory deviates both from the trajectory generated based on the swarm data and from the driving trajectory, at least to some extent. However, it in particular has to be provided here that at least the swarm data has been correspondingly checked for plausibility such that it can be resorted thereto.

It has further proven advantageous if it is interpolated between the trajectory generated based on the swarm data and the driving trajectory for determining the drivable trajectory. In particular, intermediate points of the driving trajectory and/or of the trajectories generated based on the swarm data can thus for example be skipped, whereby a smoothed drivable trajectory can be generated, whereby a more comfortable operation of the motor vehicle can be realized.

Further, it has proven advantageous if a validity value, which describes a length of a valid drivable trajectory, is determined for the drivable trajectory. For example, it can be determined depending on the comparison, how far the determined drivable trajectory is valid, whereby the drivable trajectory can be reliably correspondingly traveled. For example, it can be provided that the drivable trajectory is determined as valid for the next 10 m, 20 m, 30 m, 40 m, 50 m, 60 m, 70 m, 80 m, 90 m, 100 m, 150 m or 200 m and a correspondingly high validity value is output. Depending on the validity value, the at least partially assisted operation can then in turn be reliably generated corresponding to the length of the drivable trajectory.

The presented method is in particular a computer-implemented method. Therefore, a further aspect of the disclosure relates to a computer-readable medium with program code, which cause an electronic computing device, when the program code is processed by the electronic computing device, to perform a method according to the preceding aspect.

Furthermore, the disclosure also relates to an assistance system for checking a trajectory generated based on swarm data for plausibility for a motor vehicle operated in at least partially assisted manner, with at least one swarm data receiving device, with a detection device and with an electronic computing device, wherein the assistance system is formed for performing a method according to the preceding aspect. In particular, the method is performed by way of the assistance system.

The electronic computing device for example comprises processors, electric circuits, in particular integrated electric circuits, as well as further electronic components, to be able to perform corresponding method steps.

A still further aspect of the disclosure also relates to a motor vehicle with an assistance system according to the preceding aspect. In particular, the motor vehicle is operated in at least partially assisted or fully assisted manner. With a fully assisted motor vehicle, the assistance system can also be regarded as a supporting system for the fully automated operation.

Developments of the assistance system according to the disclosure and of the motor vehicle, which comprise features, as they have already been described in context of the developments of the method according to the disclosure, also belong to the disclosure. For this reason, the corresponding developments of the assistance system according to the disclosure and of the motor vehicle according to the disclosure are not again described here.

The disclosure also includes the combinations of the features of the described embodiments.

BRIEF DESCRIPTION OF THE SEVERAL VIEWS OF THE DRAWINGS

In the following, embodiments of the disclosure are described.

DETAILED DESCRIPTION

Figure 1:
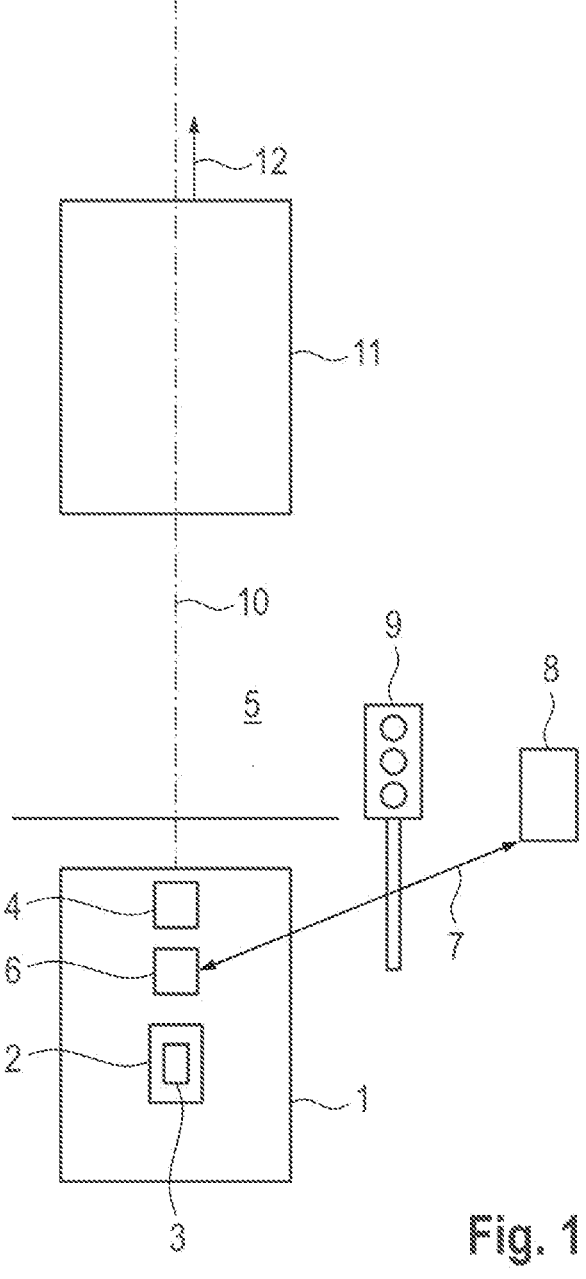
FIG. 1 shows a schematic top view according to an embodiment of a motor vehicle with an embodiment of an assistance system.

The embodiments explained in the following are advantageous embodiments of the disclosure. In the embodiments, the described components each represent individual features of the disclosure to be considered independently of each other, which also each develop the disclosure independently of each other and thereby are also to be regarded as a constituent of the disclosure in individual manner or in a combination different from the shown one. Furthermore, the described embodiments can also be supplemented by further ones of the already described features of the disclosure.

In the figures, functionally identical elements are each provided with the same reference characters.

FIG. 1 shows a schematic top view to a motor vehicle 1 with an embodiment of an assistance system 2. The motor vehicle 1 is formed at least partially automated or fully automated. The assistance system 2 comprises at least one electronic computing device 3 as well as a detection device 4, which is formed for detecting a surrounding area 5 of the motor vehicle 1. Further, the assistance system 2 comprises a swarm data receiving device 6 for receiving swarm data 7, for example from an electronic computing device 8 external to motor vehicle. In the present embodiment, it is in particular shown that the motor vehicle 1 is stopped at a traffic light 9, wherein lane markers are no longer present behind the traffic light 9. Further, it is shown that a trajectory 10 generated based on the swarm data 7 can be provided or generated from the swarm data 7.

In particular, it is provided that at least receiving the swarm data 7 is performed by way of the swarm data receiving device 6 in the method for checking the trajectory 10 generated based on the swarm data 7 for plausibility. Detecting a further motor vehicle 11 by way of the detection device 4 is effected, wherein a driving trajectory 12 of the further motor vehicle 11 is determined by way of the electronic computing device 3. The trajectory 10 generated based on the swarm data 7 is compared to the driving trajectory 12 of the further motor vehicle 11 by way of the electronic computing device, and checking the swarm data 7 for plausibility by way of the electronic computing device 3 is effected depending on the comparison.

In particular, it is shown that the further motor vehicle 11 is detected by way of a detection device 4 formed as a camera and/or radar sensor and/or lidar sensor and/or ultrasonic sensor. Preferably, the further motor vehicle 11 can be detected by way of the camera 4. Further, it is in particular shown that the further motor vehicle 11 is detected as a motor vehicle 11 driving in front of the motor vehicle 1.

Figure 2:
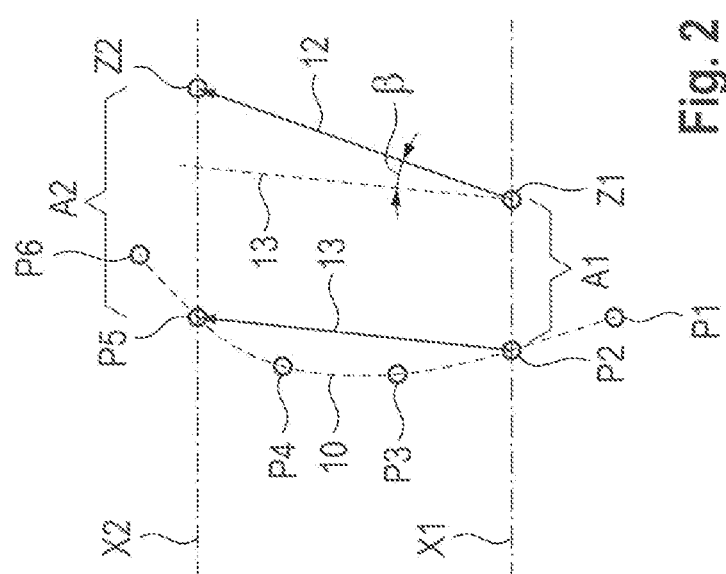
FIG. 2 shows a schematic view according to an embodiment of the method.

FIG. 2 shows a schematic diagram according to an embodiment of the method. In particular, FIG. 2 shows how the trajectory 10 generated based on the swarm data 7 is compared to the driving trajectory 12. In particular, different positions are shown. Therein, the positions P1, P2, P3, P4, P5, P6 in particular form the supporting points of the trajectory 10. Therein, the positions Z1, Z2 indicate the positions of the further motor vehicle 11. In particular, it is presently shown that it can be interpolated between the position P2 and the position P5, whereby a trajectory 13 drivable for the motor vehicle 1 can be generated. In particular, it is shown that a distance A1 is formed between the position P2 and the position Z1 and a distance A2 is formed between the position P5 and the position Z2. For example, if the trajectory 10 between the positions X1 and X2 is now plausible, thus, a distance criterion, in particular below a distance threshold value, has to be present for the distances A1 and A2. Further, an angle β also has to be less than a threshold value for the angle to be deemed plausible.

Thus, it is in particular shown that the swarm data 7 is made plausible in case of a deviation of the trajectory 10 generated based on the swarm data 7 from the driving trajectory 12 below a preset threshold value. Further, in particular the distance threshold value of the trajectory 10 and the driving trajectory 12 and/or an angle threshold value between the trajectory 10 and the driving trajectory 12 can be preset as the threshold value.

Furthermore, it is shown that the drivable trajectory 13 for the motor vehicle is determined depending on the trajectory 10 generated based on the swarm data 7 and the driving trajectory 12 and the comparison, wherein it can be interpolated between the trajectory 10 generated based on the swarm data 7 and the driving trajectory 12 for determining the drivable trajectory 13.

Figure 3:
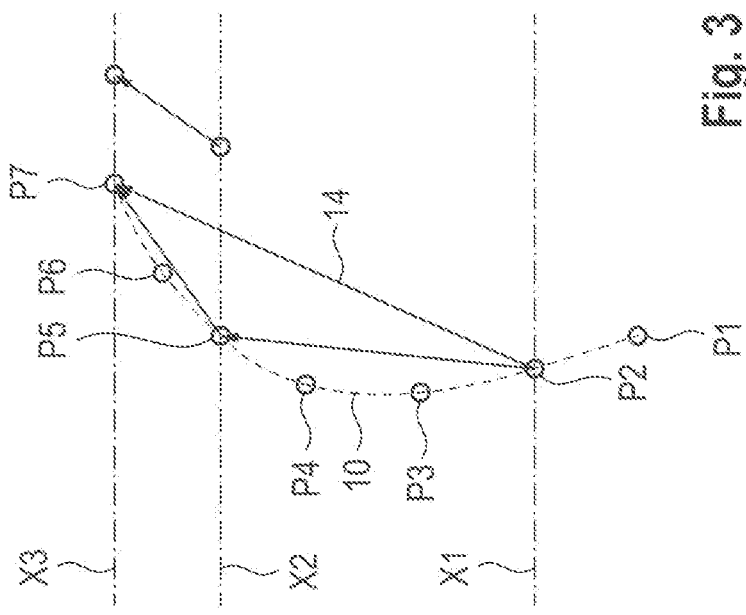
FIG. 3 shows a further schematic view according to an embodiment of the method.

FIG. 3 shows a further schematic view of a further embodiment of the method. In particular, a possibility of extending a valid vector is shown in FIG. 3. In particular, it is presently shown that the linearly interpolated supporting points between P2, P5 and P7 are for example used to generate a new driving vector 14, which is also again interpolated between the interpolated supporting points. In particular if the vector between the position P2 and P5 should for example be valid, and the vector between P5 and P7 should be valid, then, the new driving vector 14 is generated.

Furthermore, it can also be provided that, if the vector between P2 and P5 should already be present in a buffer, thus in the storage of the electronic computing device 3, and the distance between the position X3 and X2 should be lower than a threshold value, thus, the vector between P2 and P5 can in turn be replaced with the driving vector 14.

Figure 4:
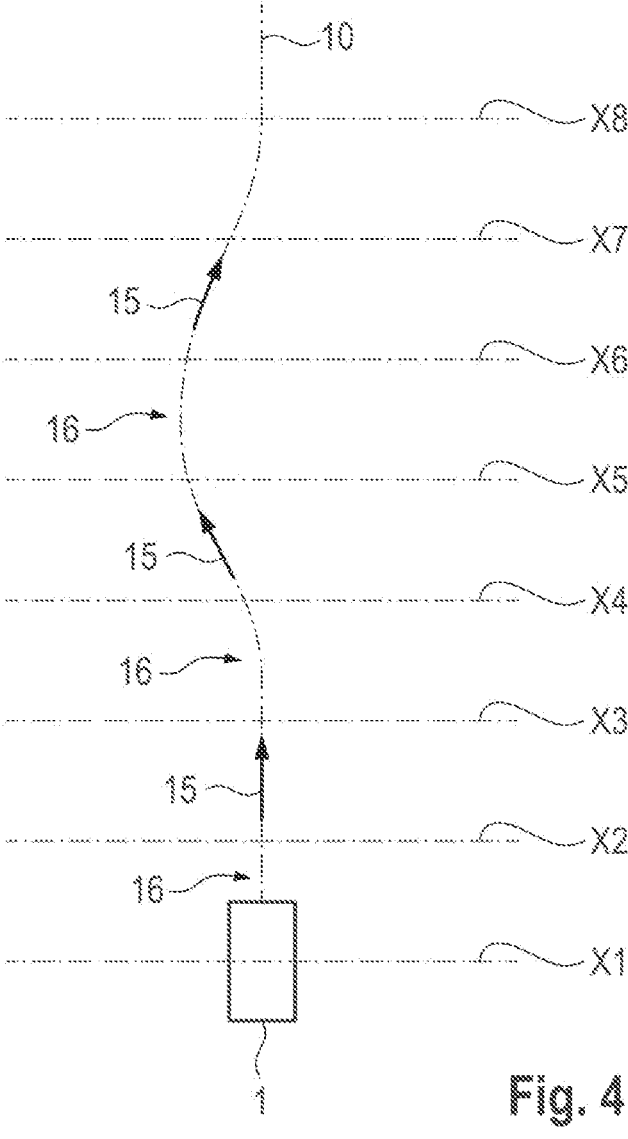
FIG. 4 shows another schematic view of an embodiment of the method.

FIG. 4 shows a further embodiment according to the method. Presently, it is in particular shown, how gaps 16 between vectors 15, which are in particular already present in the buffer and therein are lower than a preset threshold value, can be skipped such that an overall vector or the trajectory 10 can be employed as plausible. The vectors 15 are only reset if the trajectory 10 changes.

Presently, it is in particular shown that there is for example a gap 16 between the position X1 and X2, a gap 16 between the positions X3 and X4 and a gap 16 between the positions X5 and X6. A present vector or a present trajectory 10 is between the position X2 and X3, the positions X4 and X5 and between the positions X6 and X7. Thus, the trajectory 10 between the points X1 to X7 can for example be regarded as plausible.

Figure 5:
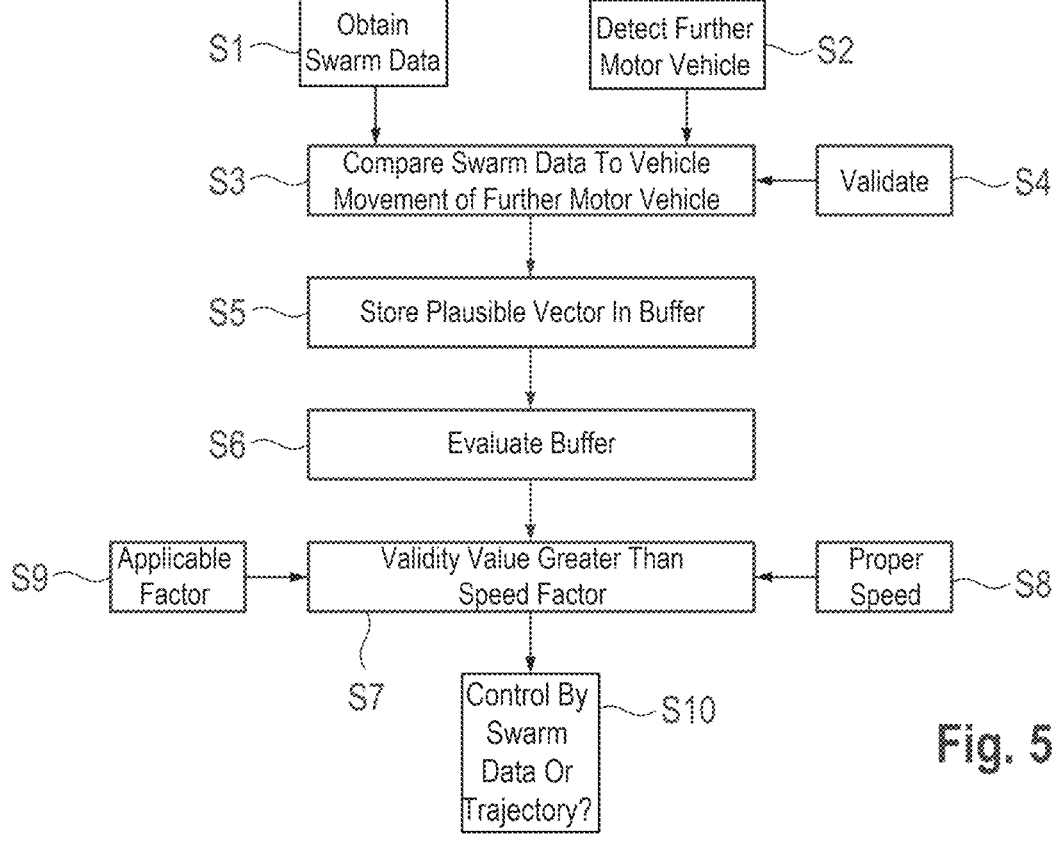
FIG. 5 shows a schematic flow diagram according to an embodiment of the method.

FIG. 5 shows a schematic flow diagram according to an embodiment of the method. In particular, obtaining the swarm data 7 is effected in a first step S1, and detecting the further motor vehicle 11 is effected in a second step S2. This is purely exemplary in the order and can for example be effected both at the same time and in a different order. In the third step S3, the swarm data 7 is compared to the vehicle movement of the further motor vehicle 11. The position of the further motor vehicle 11 is detected at all timings. The comparison between the further motor vehicle 11 and the trajectory 10 is performed via a distance and angle criterion. Hereto, a validation can be additionally provided in a fourth step S4 that it is the same further motor vehicle 11. In a fifth step S5, a plausible vector is then stored in the buffer, in particular in a storage device, for the next preset meter. If a valid vector is already in the buffer, it is examined if this vector can be extended. The buffer is compensated for from the proper movement of the motor vehicle 1 at each timing. If a vector is behind the motor vehicle 1, the vector is deled from the buffer.

In a sixth step S6, the evaluation of the buffer is effected, up to which X value, thus the validity value, the trajectory 10 is plausible. Gaps 16 less than a preset size are allowed between the vectors.

In a seventh step S7, it then follows if the validity value is greater than a speed factor. Hereto, the proper speed of the motor vehicle 1 in an eighth step S8 as well as an applicable factor in a ninth step S9 are also supplied to the seventh step S7. In a tenth step S10, it can be decided if the swarm data 7 or the trajectory 10 can be allowed for the control.

German patent application no. 10 2021 127 078.2, filed Oct. 19, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for checking a trajectory defined by at least two points indicated by swarm data for plausibility for a first motor vehicle operated in at least partially assisted manner by way of an assistance system, the method comprising:

receiving the swarm data by way of a swarm data receiving device of the assistance system;

detecting a second motor vehicle in a surrounding area of the first motor vehicle by way of a detection device of the assistance system;

determining a driving trajectory of the second motor vehicle by way of an electronic computing device of the assistance system;

comparing the trajectory defined by at least two points indicated by the swarm data to the driving trajectory of the second motor vehicle by way of the electronic computing device; and checking the trajectory defined by at least two points indicated by the swarm data for plausibility based on the comparing by way of the electronic computing device;

determining a drivable trajectory for the first motor vehicle based on the trajectory defined by at least two points indicated by the swarm data and the driving trajectory of the second motor vehicle and the comparing;

determining a validity value that describes a length of a valid drivable trajectory for the drivable trajectory for the first motor vehicle; and outputting the validity value, wherein an at least partially automated operation of the first motor vehicle is performed based on the length of the valid drivable trajectory described by the validity value.

2. The method according to claim 1, wherein the detection device includes a camera and/or as a radar sensor and/or as a lidar sensor and/or as an ultrasonic sensor.

3. The method according to claim 1, further comprising:

determining that the trajectory defined by at least two points indicated by the swarm data is made plausible in response to determining that a deviation of the trajectory defined by at least two points indicated by the swarm data from the driving trajectory below a preset threshold value.

4. The method according to claim 3, wherein a distance threshold value of the trajectory defined by at least two points indicated by the swarm data and the driving trajectory of the second motor vehicle and/or an angle threshold value between the trajectory defined by at least two points indicated by the swarm data and the driving trajectory of the second motor vehicle are preset as the preset threshold value.

5. The method according to claim 1, wherein the second motor vehicle is detected as driving in front of the first motor vehicle.

6. The method according to claim 1 wherein the determining the drivable trajectory of the first motor vehicle includes interpolating between the trajectory defined by at least two points indicated by the swarm data and the driving trajectory of the second motor vehicle.

7. A non-transitory computer-readable medium storing program code that, when processed by an electronic computing device of a first motor vehicle, causes the electronic computing device to:

receive swarm data;

detect a second motor vehicle in a surrounding area of the first motor vehicle;

determine a driving trajectory of the second motor vehicle;

compare a trajectory of the first motor vehicle defined by at least two points indicated by the swarm data to the driving trajectory of the second motor vehicle; and check the trajectory defined by at least two points indicated by the swarm data for plausibility based on a result of comparing the trajectory of the first motor vehicle defined by at least two points indicated by the swarm data to the driving trajectory of the second motor vehicle;

determine a drivable trajectory for the first motor vehicle based on the trajectory defined by at least two points indicated by the swarm data and the driving trajectory of the second motor vehicle and the comparing;

determine a validity value that describes a length of a valid drivable trajectory for the drivable trajectory for the first motor vehicle; and output the validity value, wherein an at least partially automated operation of the first motor vehicle is performed based on the length of the valid drivable trajectory described by the validity value.

8. An assistance system for checking a trajectory defined by at least two points indicated by swarm data for plausibility for a first motor vehicle operated in at least partially assisted manner, with at least one swarm data receiving device, with a detection device and with an electronic computing device, the assistance system comprising:

at least one processor; and a computer-readable medium storing program code that, when processed by the at least one processor, causes the assistance system to:

receive swarm data;

detect a second motor vehicle in a surrounding area of the first motor vehicle;

determine a driving trajectory of the second motor vehicle;

compare the trajectory of the first motor vehicle defined by at least two points indicated by the swarm data to the driving trajectory of the second motor vehicle;

check the trajectory defined by at least two points indicated by the swarm data for plausibility based on a result of comparing the trajectory of the first motor vehicle defined by at least two points indicated by the swarm data to the driving trajectory of the second motor vehicle;

determine a drivable trajectory for the first motor vehicle based on the trajectory defined by at least two points indicated by the swarm data and the driving trajectory of the second motor vehicle and the comparing;

determine a validity value that describes a length of a valid drivable trajectory for drivable trajectory for the first motor vehicle; and output the validity value, wherein an at least partially automated operation of the first motor vehicle is performed based on the length of the valid drivable trajectory described by the validity value.

\* \* \* \* \*